US009053476B2

(12) United States Patent
Douglas et al.

(10) Patent No.: US 9,053,476 B2
(45) Date of Patent: Jun. 9, 2015

(54) SYSTEMS AND METHODS FOR INITIATING PAYMENT FROM A CLIENT DEVICE

(71) Applicants: Lawrence Douglas, McLean, VA (US); Paul Moreton, Glen Allen, VA (US)

(72) Inventors: Lawrence Douglas, McLean, VA (US); Paul Moreton, Glen Allen, VA (US)

(73) Assignee: CAPITAL ONE FINANCIAL CORPORATION, McLean, VA (US)

( * ) Notice: Subject to any disclaimer, the term of this patent is extended or adjusted under 35 U.S.C. 154(b) by 0 days.

(21) Appl. No.: 14/175,052

(22) Filed: Feb. 7, 2014

(65) Prior Publication Data

US 2014/0279530 A1    Sep. 18, 2014

Related U.S. Application Data

(60) Provisional application No. 61/787,625, filed on Mar. 15, 2013.

(51) Int. Cl.
*G06Q 40/00* (2012.01)
*G06Q 10/00* (2012.01)
*G06Q 20/32* (2012.01)
*G06Q 20/40* (2012.01)

(52) U.S. Cl.
CPC ........... *G06Q 20/322* (2013.01); *G06Q 20/401* (2013.01)

(58) Field of Classification Search
CPC . G06Q 20/32; G06Q 20/322; G06Q 20/3221; H04W 4/001
USPC .................................................. 705/1.1, 35
See application file for complete search history.

(56) References Cited

U.S. PATENT DOCUMENTS

| | | | |
|---|---|---|---|
| 2008/0134049 A1* | 6/2008 | Gupta et al. | 715/738 |
| 2010/0095251 A1* | 4/2010 | Dunko | 715/863 |
| 2010/0122167 A1* | 5/2010 | Ryu | 715/716 |
| 2010/0123665 A1* | 5/2010 | Birkler | 345/173 |
| 2011/0167391 A1* | 7/2011 | Momeyer et al. | 715/863 |
| 2011/0189981 A1* | 8/2011 | Faith et al. | 455/414.1 |
| 2011/0307840 A1* | 12/2011 | Harris et al. | 715/863 |
| 2012/0095852 A1* | 4/2012 | Bauer et al. | 705/16 |
| 2012/0223880 A1* | 9/2012 | Birnbaum et al. | 345/156 |
| 2013/0053007 A1* | 2/2013 | Cosman et al. | 455/414.3 |
| 2013/0078952 A1* | 3/2013 | Yang | 455/411 |
| 2013/0191232 A1* | 7/2013 | Calman et al. | 705/18 |

* cited by examiner

*Primary Examiner* — William Rankins
(74) *Attorney, Agent, or Firm* — Finnegan, Henderson, Farabow, Garrett & Dunner LLP

(57) ABSTRACT

The disclosed embodiments include a mobile client device for automatically performing a mobile financial service function, including a memory storing software instructions, the software instructions including a mobile financial service application configured to perform financial service processes. The system may also include and one or more processors configured to execute the software instructions to detect a physical action performed on the mobile client device, and determine a first financial service function to perform based on the detected physical action, wherein the first financial service function is a function provided by the mobile financial service application. The one or more processors may also determine whether verification of a user is required, verify the user if verification of the user is required, and automatically initiate the first financial service function.

18 Claims, 8 Drawing Sheets

| CLIENT DEVICE ACTION AND ASSOCIATED SOFTWARE STATUS CONDITION | MOBILE BANKING FUNCTIONALITY INITIATED |
|---|---|
| ACTION: FLIP HORIZONTAL WHEN CLIENT DEVICE IS ON MOBILE BANKING APN. STATUS: OFF | OPEN AND PRESENT LOGON VERIFICATION FOR PAYMENT FUNCTION PROVIDED BY MOBILE BANKING APPLCATION |
| ACTION: FLIP HORIZONTAL WHEN CLIENT DEVICE IS ON MOBILE BANKING APN. STATUS: ON | INITIATE PAYMENT FUNCTION PROVIDED BY MOBILE BANKING APPLICATION |
| ACTION: SHAKE WHEN CLIENT DEVICE IS ON MOBILE BANKING APN. STATUS: ON PAYMENT LOGON FUNCTION INITIATED | AUTHORIZE PAYMENT FUNCTIONALITY TO INITIATE PAYMENT FUNCTION BY MOBILE BANKING APPLICATION |
| ACTION: FLIP VERTICAL WHEN DEVICE IS HORIZONTAL AND ON MOBILE BANKING APN. STATUS: ON | CLOSE MOBILE BANKING APPLICATION |

FIGURE 4A

SYSTEMS AND METHODS FOR INITIATING PAYMENT FROM A CLIENT DEVICE

CROSS-REFERENCE TO RELATED APPLICATIONS

This application claims priority to U.S. Provisional Patent Application No. 61/787,625, filed on Mar. 15, 2013, which is incorporated herein by reference in its entirety.

BACKGROUND

Many forms of mobile payments are available to consumers today. While traditional methods such as cash and credit cards remain popular, many consumers also use new forms of payment made available via electronic computing devices. For example, many devices contain near-field communication ("NFC") capability, which allows a payment to be initiated when the device is placed into close proximity with an NFC reader. Likewise, optical codes containing payment information, such as QR codes, may be created and displayed on a device screen. A merchant may process the payment simply by scanning the displayed code.

For security reasons, a client device user must often launch a special application and enter a username and password before these payment methods can be used. This prevents the device from initiating accidental payments, for example, by simply approaching too closely to a NFC reader. Likewise, it prevents fraudulent use if a device is lost or stolen. However, the log-in process is often cumbersome and takes longer than conventional payment methods such as credit cards or cash. Adding to the inconvenience, a user may sometimes be forced to step through a series of menu options in an application before getting to the option to make a wireless payment. Further, an individual may also forget their username or password. As a result, there is a need for a method to initiate payment on a client device simply and quickly.

SUMMARY

Disclosed embodiments include methods, systems, and articles of manufacture configured to, for example, initiate financial transactions, such as payments, from a client device in an efficient and user-friendly way. For example, the disclosed embodiments include mechanisms that detect determined gestures or motions associated with a client device, which enable a client device to deep link into a particular payment function associated with a mobile banking application executed by the client device.

For example, the disclosed embodiments include a client device that includes instructions stored in memory that may be executed by one or more processors to perform a method of initiating a financial transaction, such as a purchase transaction or other form of payment. In one example, the client device may receive a request to initiate a payment using the client device and a financial account. In certain embodiments, the request may include of an action such as a gesture or motion associated with the client device. In other embodiments, the request may include a specific input sequence. The client device may further identify a user after the request has been received, based on a simple token such as a PIN, or based on a second request that may be different from the first. Once the user has been successfully identified, the client device may initiate payment based on a payment method performed by the client device. The payment method may be selected by a user, based on a stored user preference, or based on the methods available at the merchant. Additionally, the payment details may be received from the user, from the merchant, or from a combination of both. In this manner, the client device may provide a simple, quick, and secure manner of initiating payments. Other aspects of the disclosed embodiments will be evident to those of skill in the art from this disclosure.

For example, the disclosed embodiments include a mobile client device for automatically performing a mobile financial service function, including a memory storing software instructions, the software instructions including a mobile financial service application configured to perform financial service processes. The system may also include and one or more processors configured to execute the software instructions to detect a physical action performed on the mobile client device, and determine a first financial service function to perform based on the detected physical action, wherein the first financial service function is a function provided by the mobile financial service application. The one or more processors may also determine whether verification of a user is required, verify the user if verification of the user is required, and automatically initiate the first financial service function.

The disclosed embodiments also include a computer-implemented method for automatically initiating a financial service function associated with a mobile client device including detecting, by a mobile client device executing a software application configured to perform financial service processes, a physical action performed on the mobile client device. The method may also include determining, by the mobile client device, a first financial service function to perform based on the detected physical action, wherein the first financial service function is a function provided by the software application. The method also include determining, by the mobile client device, whether verification of a user is required and verifying, by the mobile client device, the user if verification of the user is required. The method may also include automatically initiating, by the mobile client device, the first financial service function.

It is to be understood that both the foregoing general description and the following detailed description are exemplary and explanatory only and are not restrictive of the disclosed embodiments, as claimed.

The accompanying drawings, which are incorporated in and constitute a part of this specification, illustrate disclosed embodiments and, together with the description, serve to explain the disclosed embodiments.

BRIEF DESCRIPTION OF THE DRAWINGS

FIG. 4A shows an exemplary data structure listing exemplary quick pay functionality associations, consistent with disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
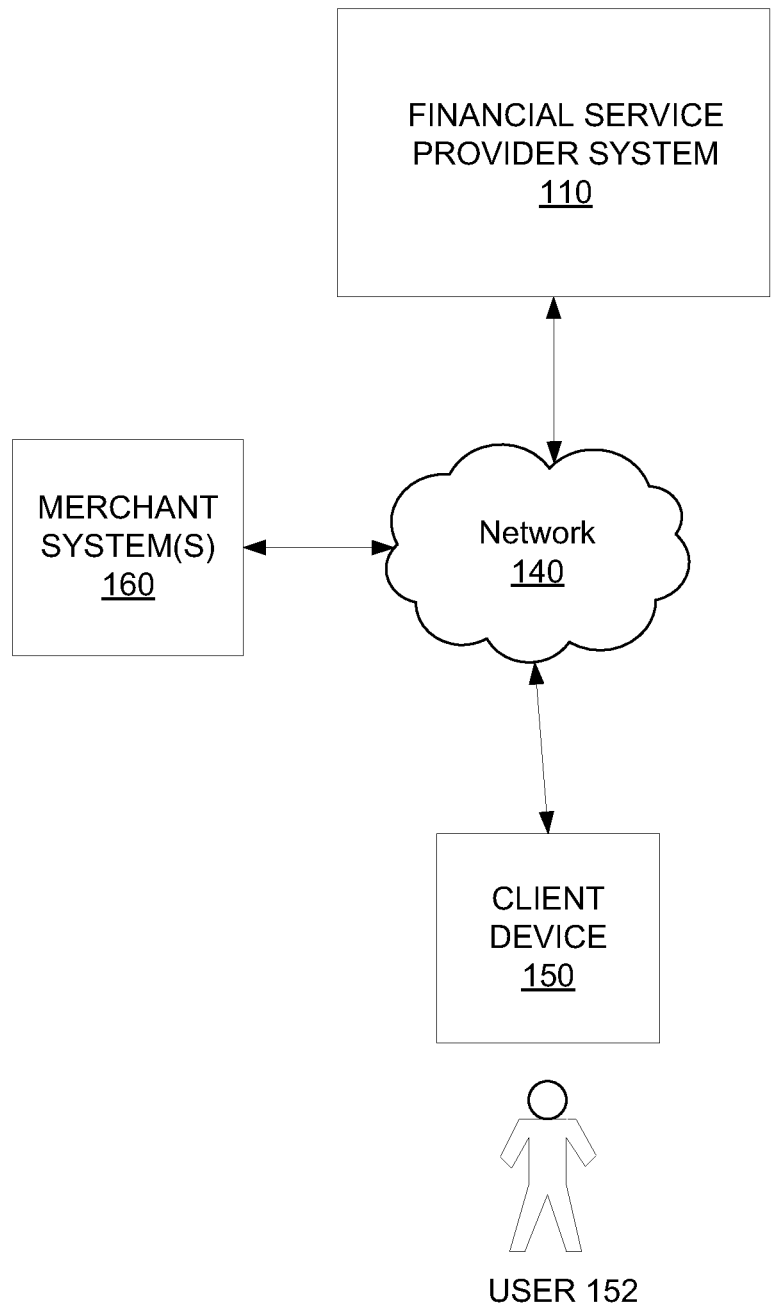
FIG. 1 is a block diagram of an exemplary system, consistent with disclosed embodiments.

FIG. 1 is a block diagram of an exemplary system 100 for performing one or more operations consistent with the disclosed embodiments. In one embodiment, system 100 may include one or more financial service provider systems 110, one or more client devices 150, one or more merchant systems 160, and network 140. The components and arrangement of the components included in system 100 may vary. Thus, system 100 may include other components that perform or assist in the performance of one or more processes consistent with the disclosed embodiments.

Components of system 100 may be computing systems configured to initiate a payment and perform financial transactions, consistent with disclosed embodiments. As further described herein, components of system 100 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored on one or more memory devices to perform one or more operations consistent with the disclosed embodiments. Components of system 100 may be configured to communicate with one or more other components of system 100, including financial service provider system 110, client devices 150, and/or merchant systems 160. In certain aspects, users may operate one or more components of system 100 to initiate one or more operations consistent with the disclosed embodiments.

Financial service provider system(s) 110 may be a system associated with a financial service provider, which may be an entity providing financial services. For example, financial service provider system 110 may be associated with a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. Financial service provider system 110 may include infrastructure and components that are configured to generate and/or provide financial service accounts such as credit card accounts, checking accounts, debit card accounts, loyalty or reward programs, lines of credit, and the like.

While aspects of the disclosed embodiments are disclosed in connection with financial service accounts, the disclosed embodiments are not so limited. The disclosed embodiments may be implemented with other types of accounts, such as travel-related accounts, itineraries, travel boarding passes, identification accounts, and any other types of account or record that is associated with a user, business entity, agency, organization, and the like. For example, instead of financial accounts, the disclosed embodiments may be used to initiate quick deep link access to a mobile application function executing on a client device 150 that provides a boarding pass for travel, or an application that initiates deep link access to a function that provides identification information for secure access by a user presenting client device 150. In other aspects, the disclosed embodiments may be implemented to provide deep link access to other functionalities in mobile applications. For example, in certain embodiments, the disclosed systems and methods may enable a user to gain deep link access to a particular application function through detection of gestures or motions associated with the client device 150.

Client device(s) 150 may be one or more computing devices configured to perform one or more operations consistent with disclosed embodiments. Client device(s) 150 may be a desktop computer, a laptop, a server, a mobile device (e.g., tablet, smart phone, etc.), a gaming device, a wearable computing device, or any other type of computing device. For exemplary purposes, aspects of the disclosed embodiments are described with reference to client device 150 as a mobile device, such as a smart phone, tablet, or the like. However, as mentioned herein, the disclosed embodiments are not limited to such examples.

Client device(s) 150 may include one or more processors configured to execute software instructions stored in memory, such as memory included in client device 150. Client device 150 may include one or more processors configured to execute software instructions stored in memory, such as memory included in client device 150. Client device 150 may include software that when executed by a processor performs known Internet-related communication and content display processes. For instance, client device 150 may execute browser software that generates and displays interfaces including content on a display device included in, or connected to, client 150. Client device 150 may be a mobile device that executes mobile device applications and/or mobile device communication software that allows client device 150 to communicate with components over network 140, and generates and displays content in interfaces via a display device included in client device 150. The disclosed embodiments are not limited to any particular configuration of client 150. For instance, client 150 may be a mobile device that stores and executes mobile applications that provide financial service related functions offered by financial service provider system 110 and/or merchant system 160, such as a mobile banking application for checking balances, paying bills, or for performing financial transactions, such as mobile payments with point of sale (POS) or similar components, etc. In certain embodiments, client device 150 may be configured to execute software instructions relating to location services, such as GPS locations. For example, client device 150 may be configured to determine a geographic location of client 150 (and associated user 152) and provide location data and time stamp data corresponding to the location data.

In one embodiment, a user 152 may use client device 150 to perform one or more operations consistent with the disclosed embodiments. In one aspect, user 152 may be a customer of a financial service provider that provides financial service accounts, such as a financial service provider associated with financial service provider system 110. For instance, a financial service provider may maintain a financial service account (e.g., credit card account) for user 152 that user 152 may use to purchase goods and/or services online or at brick and mortar locations associated with a merchant relating to merchant system 160. In other embodiments, user 152 may be a potential customer of a financial service provider associated with financial service provider 110 or may not be affiliated with such a financial service provider from the user's perspective and/or the financial service provider's perspective.

In certain aspects, client device 150 may be a computing device that stores and executes applications and/or communication software that allows client device 150 to communicate with components over network 140. Client device 150 may also execute applications and/or communication software to perform financial transaction processes, including payment methods, such as NFC, optical payment methods such as QR codes, audio-based payment methods, internet-based payment method, SMS payment methods, or other payment methods known in the art. The disclosed embodiments are not limited to any particular configuration of client device 150.

Merchant system 160 may be one or more computing systems associated with a merchant, which may be an entity that provides goods, services, and/or information, such as a retailer (e.g., Macy's®, Target®, etc.), grocery store, service provider (e.g., utility company, etc.), non-profit organization (e.g., ACLU™, AARP®, etc.) or any other type of entity that provides goods, services, and/or information that consumers (e.g., end-users or other business entities, such as user 152) may purchase, consume, use, etc. Merchant system(s) 160 is not limited to systems associated with merchant(s) that conduct business in any particular industry or field.

Merchant system 160 may be associated with a merchant brick and mortar location(s) that a consumer (e.g., user 152) may physically visit and purchase goods and services. Such physical locations may include merchant system 160, which may include computing devices that perform financial service transactions with consumers (e.g., Point of Sale (POS) terminal(s), kiosks, etc.). Merchant system 160 may also include back- and/or front-end computing components that store data and execute software instructions to perform operations consistent with disclosed embodiments, such as computers that are operated by employees of the merchant (e.g., back office systems, etc.). Merchant system 160 may also be associated with a merchant that provides goods and/or service via known online or e-commerce type of solutions. For example, such a merchant may sell goods via a website using known online or e-commerce systems and solutions to market, sell, and process online transactions. Merchant system 160 may include one or more computing systems, such as server(s), that are configured to execute stored software instructions to perform operations associated with a merchant, including one or more processes associated with processing purchase transactions, generating transaction data, generating product data (e.g., SKU data) relating to purchase transactions, etc.

Network 140 may be any type of network configured to provide communications between components of system 100. For example, network 140 may be any type of network (including infrastructure) that provides communications, exchanges information, and/or facilitates the exchange of information, such as the Internet, a Local Area Network, NFC, optical code scanner, or other suitable connection(s) that enables the sending and receiving of information between the components of system 100. In other embodiments, one or more components of system 100 may communicate directly through a dedicated communication link(s), such as links between financial service provider system 110, client devices 150, and merchant systems 160.

Figure 2:
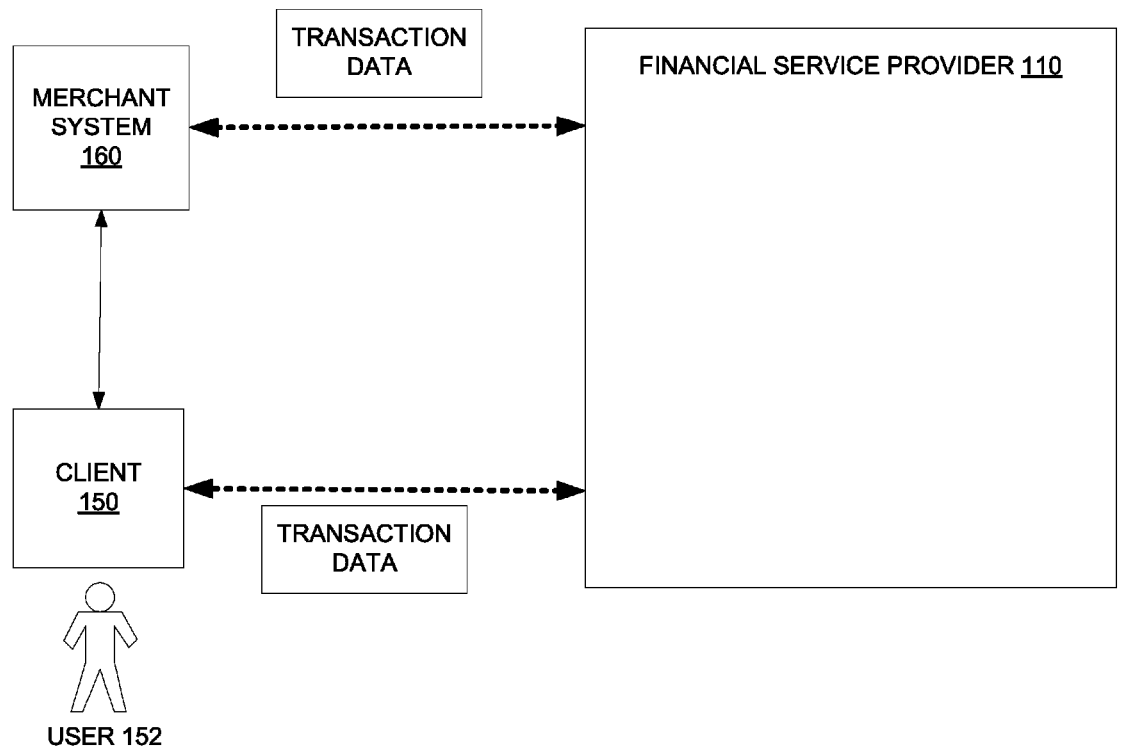
FIG. 2 is a block diagram of an alternative embodiment of the system, consistent with disclosed embodiments.

FIG. 2 shows a block diagram of an exemplary arrangement 200 for initiating a payment on a client device 150 consistent with disclosed embodiments. As shown in this figure, a user 152 may operate a client device 150 to initiate a payment to a merchant system 160 in accordance with the disclosed embodiments. Client device 150 may utilize a payment system such as NFC, optical barcodes or QR codes, audio payment methods, internet-based payment methods, SMS-based payment methods, or any other payment system or payment process known in the art. Client device 150 and/or merchant system 160 may communicate data regarding the payment to financial service provider system 110. Financial service provider system 110 may send information such as payment confirmation, failure notification, or a request for more information to merchant system 160 and/or client 150.

It is to be understood that the configuration and boundaries of the functional building blocks of systems 100 and 200 have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, client device 150 and merchant system 160 may constitute a part of components of systems 100 and 200 other than those specifically described, or may constitute a part of multiple components of system 100 (i.e., a distributed system). Such alternatives fall within the scope and spirit of the disclosed embodiments.

Figure 3:
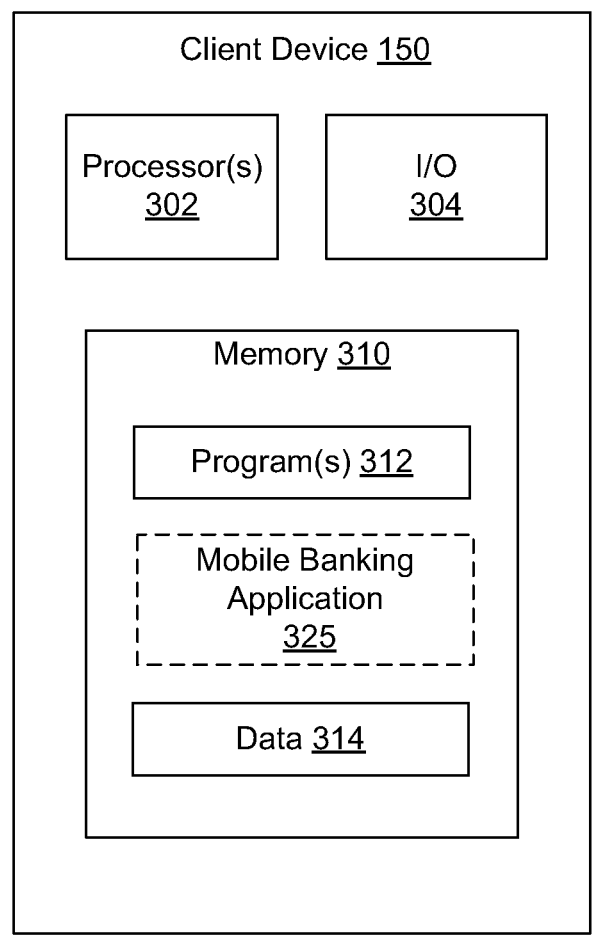
FIG. 3 is a block diagram of an exemplary client device, consistent with disclosed embodiments.

FIG. 3 shows an exemplary client device 150 consistent with disclosed embodiments. In one embodiment, client device 150 may include one or more processors 302, one or more input/output (I/O) devices 304, and one or more memories 310. In some embodiments, client device 150 may take the form of a mobile computing device such as a smartphone or tablet, a general purpose computer, or any combination of these components. Alternatively, client device 150 (or a system including client device 150) may be configured as a particular apparatus, embedded system, dedicated circuit, and the like based on the storage, execution, and/or implementation of the software instructions that perform one or more operations consistent with the disclosed embodiments. According to some embodiments, client device 150 may comprise web browsers(s) or similar computing devices that access web site(s) consistent with disclosed embodiments.

Processor 302 may include one or more known processing devices, such as mobile device microprocessors manufactured by Intel™, NVIDIA™, or any various other processors. The disclosed embodiments are not limited to any type of processor(s) configured in client device 150.

Memory 310 may include one or more storage devices configured to store instructions used by processor 302 to perform functions related to disclosed embodiments. For example, memory 310 may be configured with one or more software instructions, such as program(s) 312 that may perform one or more operations when executed by processor 302. The disclosed embodiments are not limited to separate programs or computers configured to perform dedicated tasks. For example, memory 310 may include a single program 302 that performs the functions of the client device 150, or program 312 may comprise multiple programs. Memory 310 may also store data 314 that is used by one or more programs 312.

In certain embodiments, memory 310 may store a mobile banking application 325 that may be executed by processor(s) 302 to perform one or more mobile banking application processes consistent with disclosed embodiments. For example, mobile banking application 325 may be provided by a financial service provider system 110 or another system associated with a financial service provider that provides financial accounts held by a user, such as user 152. In certain aspects, mobile banking application 325, or another software component, may be configured to perform detection processes for detecting certain positions and orientations of client device 150. For instance, these software instructions, when executed by processor(s) 302 may process information received from components within client device 150 that detect and provide signals indicating the orientation of client device 150, or whether certain motions or movements are performed on client device 150 (e.g., shaking, twisting, turning, flipping, moving at a certain accelerations or directions, etc.) The software instructions may process this information to determine whether certain conditions have been met in relation to certain mobile banking application functions, such as payment functions that may be deep linked into options of the mobile banking application.

I/O devices 304 may be one or more devices configured to allow data to be received and/or transmitted by client device 150. I/O devices 304 may include one or more digital and/or analog devices that allow client device 150 to communicate with other machines and devices, such as other components of systems 100 and 200. For example, I/O devices 304 may include a screen for displaying optical payment methods such as QR codes, or providing information to the user, I/O devices 304 may also include components for NFC communication. I/O devices 304 may also include one or more digital and/or analog devices that allow user 152 to interact with client device 150 such as a touch-sensitive area, buttons, or microphones. I/O devices 304 may also include one or more accelerometers to detect the orientation and inertia of device 150. I/O devices 304 may also include other components known in the art for interacting with user 152, merchant system 160, or financial service provider system 110.

The components of client device 150 may be implemented in hardware, software, or a combination of both hardware and software, as will be apparent to those skilled in the art.

Figure 4:
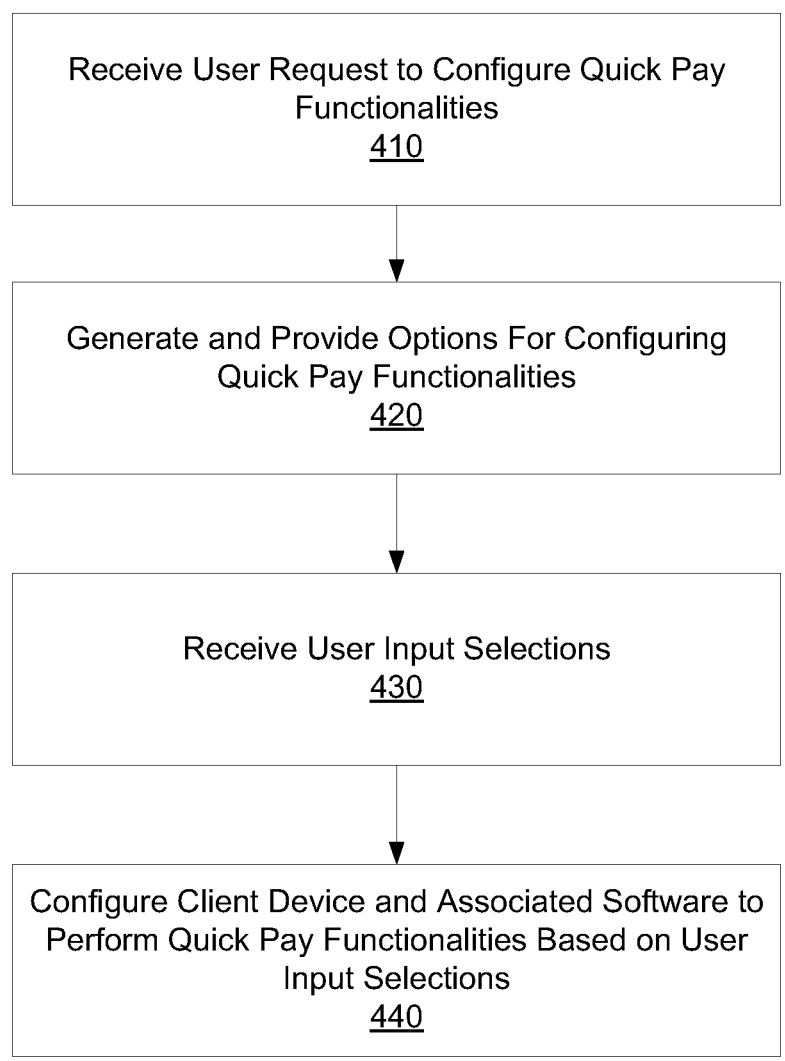
FIG. 4 is a flow chart of an exemplary quick pay registration process, consistent with disclosed embodiments.

In certain aspects, user 152 may configure software applications, such as mobile banking application 325, to perform quick payment functionalities based on gestures, motions, or similar actions taken on client device 150. For instance, in certain embodiments, client device 150 may be configured to detect when it has been flipped to a certain position (e.g., horizontal, vertical, angular, etc.), and in response, initiate financial transaction functionalities that may be deep linked within one or more levels of functionality within mobile banking application 325. User 152 may configure client device 150, ad/or mobile banking application 325, or another software component, to perform certain actions based on the detected movements, motions, gestures, and the like performed on client device 150. FIG. 4 shows a flowchart of an exemplary quick pay configuration process 400, consistent with disclosed embodiments.

In step 410, client device 150 may receive input from user 152 to request configuration of a quick pay option provided by the software executed by client device 150 in relation to mobile banking functionalities (although as noted above, the disclosed embodiments may be implemented for other types of functionalities that may be unrelated to financial services). In response, client device 150 may present user 152 via a display device one or more interfaces that enable user 152 to configure the quick pay features consistent with the disclosed embodiments (step 420). For example, client device 150 may present user 152 with the option to associate one or more specific gestures, motions, movements, or other actions to one or more mobile banking functionalities that may be provided by mobile banking application 325. The associated mobile banking functionalities may include functions that are deep linked within the mobile banking application options, such as a payment process that allows the application to perform wireless purchase transactions with POS or similar devices using known wireless purchase transaction technologies.

Client device 150 may receive user 152's input selections regarding the options for configuring the quick pay functionalities (step 430). Client device 150 may store the information in one or more data structures that may be used by software instructions that perform quick pay functionalities consistent with disclosed embodiments (step 440). FIG. 4A shows an exemplary data structure listing exemplary quick pay functionality associations that the disclosed embodiments may configure in accordance with disclosed embodiments. The listing of FIG. 4A is exemplary. The disclosed embodiments may enable user 152 to configure other types of actions with other types of application functionalities. Further, the disclosed embodiments include implementations where action and application functionalities may be preconfigured with the mobile banking application software, where a user does not need, or may not be allowed to, configure, modify, etc.

Figure 5:
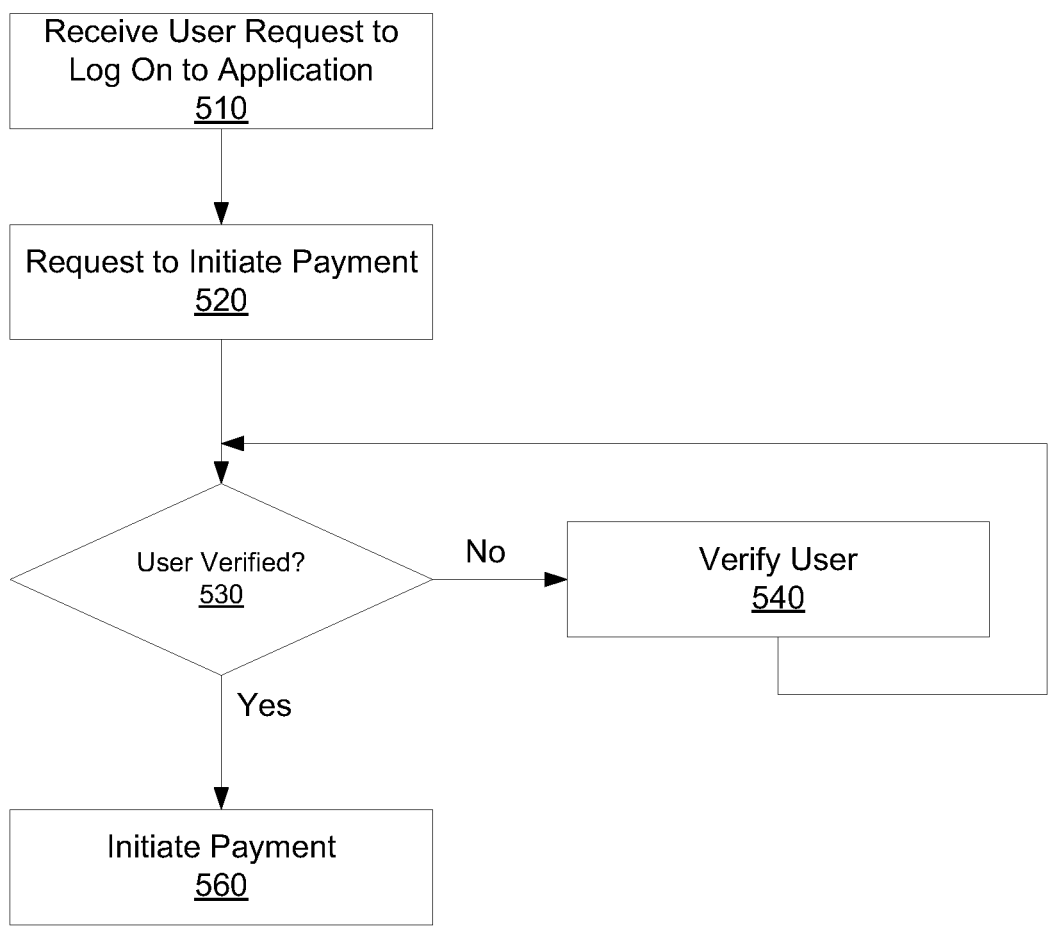
FIG. 5 is a flowchart of an exemplary user registration process, consistent with disclosed embodiments.

FIG. 5 is a flowchart of an exemplary quick payment process consistent with the disclosed embodiments. In one aspect, one or more processes of FIG. 5 may be performed by client device 150, and may be performed by a mobile banking application (e.g., 325) or other software instructions stored and executed by client device 150. At step 510, client device 150 may receive input indicating that user 152 requests to log into the mobile banking application. In one embodiment, mobile banking application 325 may require user to present credentials to enable access to the functionalities of the application, such as a username and password.

At step 520, client device 150 may receive a request from user 152 to initiate payment (or some other mobile banking application functionality). In certain embodiments, the request may consist of a physical manipulation of client device 150, such as flipping, tilting, or moving the device in a specific manner (e.g., shaking side to side, shaking up and down, shaking a determined number of times, etc.). In certain embodiments, client device 150 may include movement and orientation components, such as an accelerometer and/or orientation detection circuitry (or similar circuitry or technology known in the art), that may be configured to detect the orientation and/or movement of client device 150. The movement and orientation components may generate signals that processor(s) 301 may use when executing software instructions relating to the mobile banking application 325 to determine one or more quick pay functionalities to initiate. In one aspect, client device 150 may use a data structure including configured associations between actions performed on client device 150 and mobile banking application functionalities, such as the exemplary associations shown in FIG. 4A. In one example, mobile device application 325 (or another software component) may determine a request to initiate payment when client device 150 has been rotated from a portrait orientation to a landscape orientation. Other motions may also be used, such as shaking, flipping, rotating, etc.

In certain aspects, mobile banking application 325 may be configured to provide multiple payment methods (e.g., both NFC and QR codes are supported). In certain aspects, the quick pay functionalities of the disclosed embodiments may be configured to associate a specific motion to each payment method. For example, placing client device 150 so that its screen is facing upwards may be used to initiate a QR payment, since this position may be the easiest for a merchant device to scan. In another embodiment, a different motion, such as moving the device in a horizontal direction, or tapping the device against a surface, may be used to activate a second payment method, such as NFC. Many NFC readers require a tapping or sweeping motion, so this type of motion may be more intuitive to the user. In other embodiments, a single motion may be used to initiate a payment even when multiple methods are possible. In certain embodiments, user 152 may be prompted to select a method, or the mobile banking application (or other software component) may be configured to automatically select a payment method, for example by determining the methods available for a merchant involved in the payment transaction.

Other means of initiating a payment may also be used. For example, pressing a dedicated button on the device, or entering a specific sequence of button presses. In this manner, the user may discretely enter a pattern of presses known only to them, in order to initiate a payment. For example, by pressing a volume up button on the device in a sequence. This sequence may be preconfigured with the mobile banking application software (e.g., may be assigned by the financial service provider providing the mobile banking application stored on client device 150), or may be selected by user 152, such as a PIN. A similar sequence of taps may also be used for devices that comprise an accelerometer or are sensitive to touch. In this embodiment, user 152 may initiate payment by tapping a portion of client device 150 (e.g., a touch screen display, etc.) in a specific sequence, or a specific number of times.

For client devices 150 that include a touch-sensitive or stylus-sensitive input, user 152 may also initiate payment by drawing a specific pattern or writing specific characters on the device. For example, a user may write a code word specific to that user, such as their name or initials, on the device to initiate payment.

At step 530, client device 150 may determine whether the user has been verified. For example, if the user log on request 510 consists of a specific sequence, pattern, number, or other secret known only to the user, then the request itself may be used to authenticate the user. In some circumstances, further authentication may be desired for additional security. For example, further authentication may be desired for requests based on rotating or flipping the device in a specific direction. In these embodiments, a further authentication may be used to identify user 152 or authorize the payment request (step 530). In certain aspects, authentication may consist of any known method of identifying a user or authorizing a process to be performed. In one aspect, client device 150 may prompt user 152 for an identification input (e.g., password or PIN) to verify user 152 (e.g., step 540). At step 530, if client device 150 determines that user 152 has been verified (step 530; Yes), the process may proceed to step 560 for initiating the requested payment functionality (step 560). If client device 150 does not verify user 152 (step 530; No), client device 150 may further verify user or the requested process (step 540). Methods known in the art may be used to verify the user at step 540, including the methods described above in connection with step 520. For example, a first method such as tilting the device may be used to request to initiate a payment at step 520 and a second method, such as inputting a code sequence (e.g., word, numerals, etc.) on the device screen may be used to verify the user at step 540.

Once the device has verified the user, client device 150 may initiate the payment process (step 560). The payment method may comprise any type of payment method known in the art, such as NFC. QR code, internet-based payment, SMS-based payment, or other types of payment methods. In one embodiment, the mobile banking application running on client device 150 may initiate payment by allowing user 152 to enter one or more transaction details. The application may generate interface(s) for displaying a QR code on a device screen of client device 150. By scanning the QR code, a merchant system 160 may process and complete the requested financial transaction. In other embodiments, the payment method and details may be received from merchant system 160, based on one or more user preferences stored in memory on client device 150, or received from the financial service provider system 110. In these embodiments, client device 150 may execute software that may prompt user 152 to verify the payment details before the payment is initiated.

Figure 6:
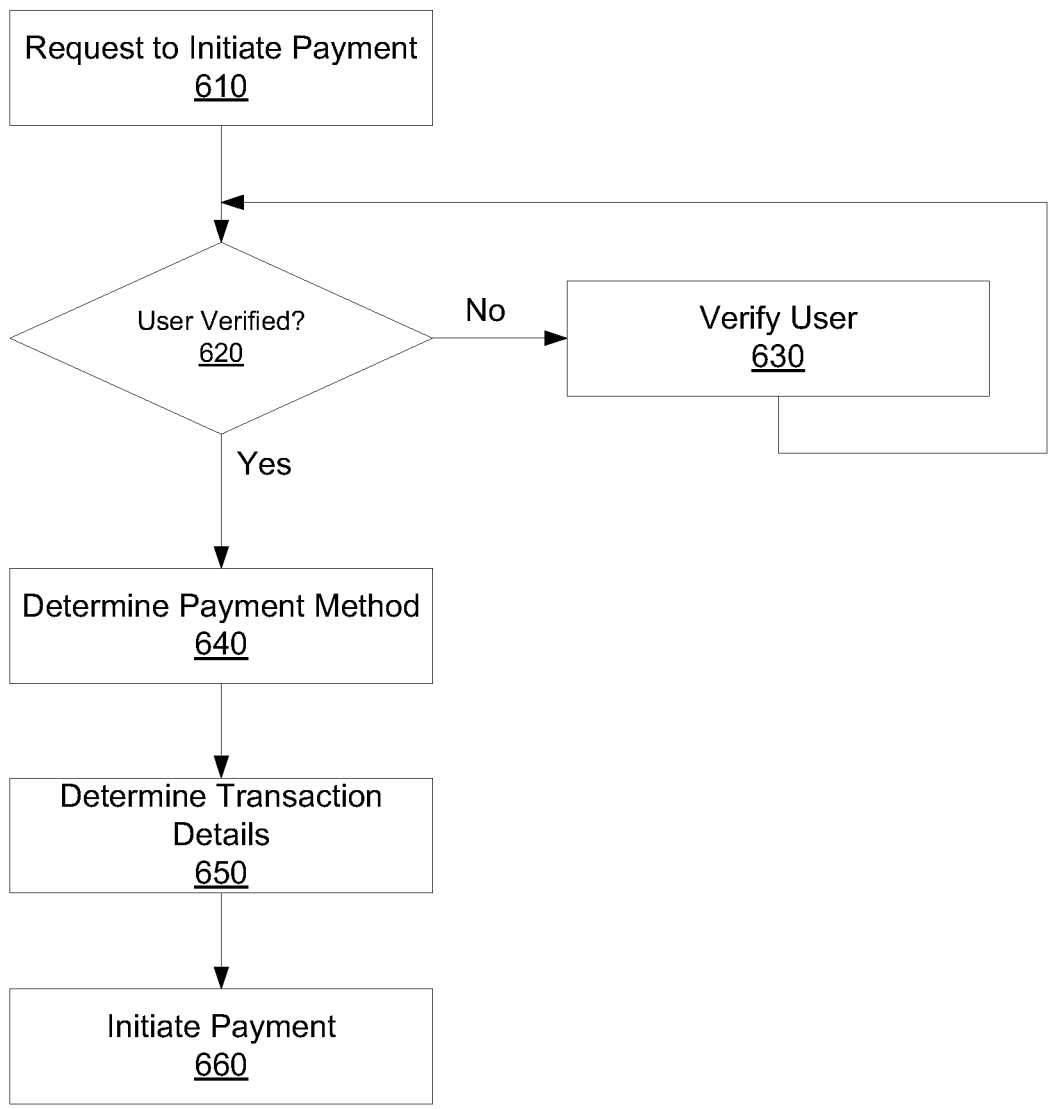
FIG. 6 is a flowchart of an exemplary payment activation process, consistent with disclosed embodiments.

FIG. 6 is a flowchart of an alternative payment process 600 consistent with disclosed embodiments. In one aspect, payment process 600 may include quick pay functionalities that do not require a user to log in to a mobile banking application (or other software application) before requesting a payment. For example, in step 610, a user 152 may request to initiate a payment process by using one of the methods described above in connection with step 510 of FIG. 5. At step 620, client device 150 may execute software to determine whether user 152 has been verified. Verification may be performed using similar processes or methods as those discussed above in connection with FIG. 5. For example, client device 150 may verify user 152 based on the type of payment request that is received. For example, if a specific sequence of taps is used to request a payment or orientation or movement of client device 150 is detected, then further verification of user 152 may not be necessary. If, however, user 152 is not verified at step 620, the process may proceed to step 630 to perform verification processes. In one embodiment, the verification processes of step 630 may include one or more of the processes described above in connection with step 540 of FIG. 5.

At step 640, client device 150 may determine the type of payment method to be used for performing payment associated with the financial service account relating to user 152. The payment method may be any method of payment known in the art, such as NFC payments, optical codes such as QR codes, audio-based payment systems, or any other known payment method. In one embodiment, client device 150 may automatically select the payment method based on a stored user preference or based on preconfigured rules stored in memory of client device 150. In another embodiment, client device 150 may query merchant system 160 to determine what types of payment methods are available at that merchant, and select an available method. In another embodiment, client device 150 may prompt user 152 to select a payment method.

The disclosed embodiments may include a transaction detail process. For example, at optional step 650, client device 150 may determine one or more details for the requested payment. Transaction details may include one or more of the payment amount, the identity of the financial service account that the funds for the payment transaction will be drawn from, and the destination to which the funds will be provided. In one embodiment, client device 150 may prompt user 150 may to manually enter one or more transaction details using known input mechanisms for client device 150 (e.g., touch screen, keypad, voice recognition technology, etc.). In another embodiment, client device 150 may execute software that generates communications that may be provided to merchant system 160 to request and receive one or more transaction details, such as the payment amount and the destination, and may prompt user 152 for the source account. In another embodiment client device 150 may automatically select a source account based on user defined preferences. For example, client device 150 may allow user 152 to identify one or more financial accounts to be used for particular mobile banking application functionalities. User 152 may associated the financial accounts to particular payment methods during the quick pay configuration process 400 or during another configuration process provided by client device 150. Client device 150 may also prompt user 152 to confirm the transaction details before allowing client device 150 to initiate the payment.

At step 660, client device 150 may perform process(es) for initiating payment using the selected method and transaction details. Once the payment has been initiated by client device 150, the disclosed embodiments may perform known payment processes for completing financial transactions using client device 150 and related financial accounts, such as confirming and authorizing payment from a designated financial account through financial service provider system 110 using the selected payment method.

In certain embodiments, one or more of process steps 610-660 may be performed by mobile banking application 325 running on client device 150. As will be apparent to those skilled in the art, each of these steps may also be performed by other software instructions executed by one or more processors in client device 150.

Figure 7:
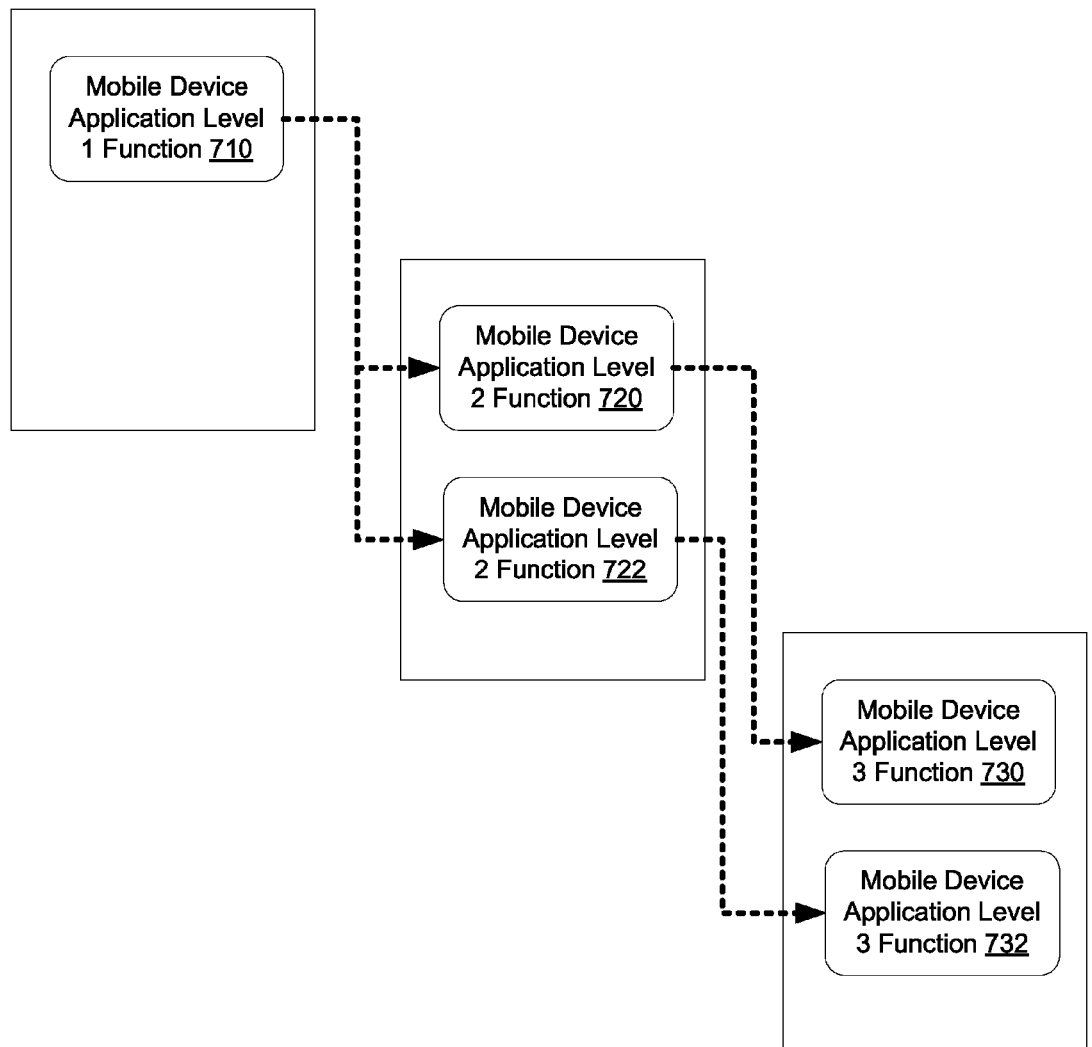
FIG. 7 is a block diagram of exemplary relationships between mobile device application functions, consistent with disclosed embodiments.

Other embodiments will be apparent to those skilled in the art from consideration of the specification and practice of the disclosed embodiments. For example, the disclosed embodiments provide, in some examples, automatic access to deep linked application functionalities based on detected physical actions performed on client device 150. FIG. 7 shows a block diagram of an exemplary mobile device application functionality relationship consistent with certain embodiments. As exemplified in the figure, a mobile device application, such as mobile banking application 325, may provide different functionalities, which may be accessible by a user through one or more levels of functionalities and/or menu options. For example, user 152 may manually access functionality 732 by selecting options that may be provided on interfaces by client device 150 associated with high level functionalities 722 and 710. Aspects of the disclosed embodiments may allow client device 150 to automatically initiate functionality of selected deep linked application functionalities (e.g., functions 720, 722, 730, 732) based on determined physical actions performed on client device 150 (e.g., rotating, flipping, shaking, etc.).

The disclosed embodiments may be configured such that actions performed on client device 150 (e.g., rotating, flipping, shaking, etc.) as described herein may be used to initiate other types of functionality. For example, in one embodiment, the disclosed embodiments may be configured to enable a user to log into or gain access to a predetermined application (e.g., a mobile banking application, mobile financial service application, application that provides a boarding pass for travel, application that provides identification information for secure access by a user, or any other predetermined application that may be stored and executed by client device 150) by performing a specific action (e.g., turning the device horizontal, shaking, moving side to side, etc.), or sequence of actions (e.g., two or more actions, such as turning the device horizontal, then counter-clockwise along a first axis to vertical, then flipping 180 degrees along a second axis to vertical in the opposite direction, etc.). The disclosed embodiments may also be configured to enable a user to unlock client device 150, an application, or an option, function, or deep linked function of an application by performing an action or sequence of actions on client device 150 (e.g., shaking to unlock client device 150, or rotating and moving in a specific direction, etc.) As will be further apparent to a person skilled in the art, each of these embodiments and other embodiments may be used alone, or in combination.

Moreover, it is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. A computer-implemented method for automatically initiating a financial service function associated with a mobile client device, comprising;
   detecting, by a mobile client device executing a software application configured to perform financial service processes, a first motion of the mobile client device by a physical action performed on the mobile client device;
   determining, by the mobile client device, a first financial service function to perform based on the detected first motion, wherein the first financial service function is a function provided by the software application;
   determining, by the mobile client device, whether verification of a user is required to perform the first financial service function based on whether the mobile client device is configured to use the first motion to verify a user;
   requesting a second motion be performed by physical action on the mobile client device that is different from the first motion when the mobile client device is not configured to verify the user based on the first motion;
   verifying the user, by the mobile client device, based on the first or second motion; and
   automatically initiating, by the mobile client device, the first financial service function based at least on the verification.

2. The method of claim 1, wherein the first motion or second motion performed on the mobile client device includes a change in orientation of the mobile client device or a specific movement of the mobile client device.

3. The method of claim 2, wherein the specific movement of the mobile client device comprises at least one of moving the mobile client device in a specific direction, shaking, tapping, twisting, or turning the mobile client device, and wherein the change in orientation of the mobile client device comprises at least one of changing the orientation of the mobile client device between a landscape orientation and a portrait orientation or moving the mobile client device to a specific orientation.

4. The method of claim 1, wherein the first financial service function is a deep linked function provided by the software application.

5. The method of claim 1, wherein the first financial service function is a payment function provided by the software application.

6. The method of claim 5, wherein the payment function includes a payment method comprising at least one of an optical payment code payment method, a near-field communication payment method, an audio payment signal method, an internet-based payment method, or an SMS-based payment method.

7. A mobile client device for automatically performing a mobile financial service function, comprising:
   a memory storing software instructions, the software instructions including a mobile financial service application configured to perform financial service processes; and
   one or more processors configured to execute the software instructions to:
     detect a first motion of the mobile client device by a physical action performed on the mobile client device,
     determine a first financial service function to perform based on the detected first motion, wherein the first financial service function is a function provided by the mobile financial service application, determine whether verification of a user is required to perform the first financial service function based on whether the mobile client device is configured to verify the user based on the first motion, request a second motion be performed by physical action on the mobile client device that is different from the first motion when the mobile client device is not configured to verify the user based on the first motion, verify the user based on the first or second physical action, and automatically initiate the first financial service function based at least on the verification.

8. The system of claim 7, wherein the first motion or second motion performed on the mobile client device includes a change in orientation of the mobile client device or a specific movement of the mobile client device.

9. The system of claim 8, wherein the specific movement of the mobile client device comprises at least one of moving the mobile client device in a specific direction, shaking, tapping, twisting, or turning the mobile client device and wherein the change in orientation of the mobile client device comprises at least one of changing the orientation of the mobile client device between a landscape orientation and a portrait orientation or moving the mobile client device to a specific orientation.

10. The system of claim 7, wherein the first financial service function is a deep linked function provided by the software application.

11. The system of claim 7, wherein the first financial service function is a payment function provided by the software application.

12. The system of claim 11, wherein the payment function includes a payment method comprising at least one of an optical payment code payment method, a near-field communication payment method, an audio payment signal method, an internet-based payment method, or an SMS-based payment method.

13. A non-transitory computer-readable storage medium storing instructions that, when executed by a processor, causes the processor to perform operations comprising:

detecting, by a mobile client device executing a software application configured to perform financial service processes, a first motion of the mobile client device by a physical action performed on the mobile client device;

determining, by the mobile client device, a first financial service function to perform based on the detected first motion, wherein the first financial service function is a function provided by the software application;

determining, by the mobile client device, whether verification of a user is required to perform the first financial service function based on whether the mobile client device is configured to use the first motion to verify a user;

requesting a second motion be performed by physical action on the mobile client device that is different from the first motion when the mobile client device is not configured to verify the user based on the first motion;

verifying the user, by the mobile client device, based on the first or second motion; and automatically initiating, by the mobile client device, the first financial service function based at least on the verification.

14. The storage medium of claim 13, wherein the first motion or second motion performed on the mobile client device includes a change in orientation of the mobile client device or a specific movement of the mobile client device.

15. The storage medium of claim 14, wherein the specific movement of the mobile client device comprises at least one of moving the mobile client device in a specific direction, shaking, tapping, twisting, or turning the mobile client device and wherein the change in orientation of the mobile client device comprises at least one of changing the orientation of the mobile client device between a landscape orientation and a portrait orientation or moving the mobile client device to a specific orientation.

16. The storage medium of claim 13, wherein the first financial service function is a deep linked function provided by the software application.

17. The storage medium of claim 13, wherein the first financial service function is a payment function provided by the software application.

18. The storage medium of claim 17, wherein the payment function includes a payment method comprising at least one of an optical payment code payment method, a near-field communication payment method, an audio payment signal method, an internet-based payment method, or an SMS-based payment method.

* * * * *